Sept. 27, 1966 W. L. WELCH 3,275,326

METHOD AND APPARATUS FOR MAKING PHONOGRAPHIC RE-RECORDINGS

Filed Oct. 22, 1963 2 Sheets-Sheet 1

INVENTOR.
WALTER L. WELCH

BY

George H. Fritzinger
AGENT

METHOD AND APPARATUS FOR MAKING PHONOGRAPHIC RE-RECORDINGS

INVENTOR.
WALTER L. WELCH
BY
George H. Fritzinger
AGENT 3,275,326

METHOD AND APPARATUS FOR MAKING PHONOGRAPHIC RE-RECORDINGS

Walter L. Welch, 919 Onondaga Ave., Syracuse 7, N.Y.

Filed Oct. 22, 1963, Ser. No. 318,009
8 Claims. (Cl. 274—3)

This invention relates to a new method and apparatus for making improved re-recordings of early phonographic records.

It is an object to provide a system and apparatus for obtaining more faithful reproductions of the original sounds recorded on the early master records.

It is another object to provide an improved system and apparatus by which re-recordings of original master recordings can be produced having an expanded wave front, less record noise and less random imperfections which occur in duplicate recordings derived from the same master recording.

In the present description, the term "record" is used to mean the physical record medium (cylinder or disk) bearing a record groove modulated according to the sounds recorded thereon, the term "duplicate record" is herein used to refer to records made from the same master and which are the same except for random imperfections, and the term "recording" is used to mean any version of the same performance whether on cylinder, disk, tape, or sound-on-film.

The invention is designed especially to enable improved re-recordings to be obtained from the original Edison four-minute Amberol wax cylinders and from the original blue Amberol celluloid cylinders, but the invention is useful as well in connection with the early vertical and lateral cut disk records.

The historical value of the early Edison cylinder records is becoming more and more appreciated because these records represent our only preservation of the works of the artists of a half-century ago. These early recordings were made acoustically generally with poor frequency range and poor tonal balance in comparison to present day standards. Also, in making these early recordings the sounds were picked up by an acoustic horn from a confined area, requiring a close grouping of the vocalists or instruments being recorded, which resulted in the recordings having a constricted character lacking in breadth of wave front. Further, the early methods of mechanically duplicating records from an original master oft resulted in the introduction of random surface defects as from air bubbles, uneven texture of record material, etc., which introduced random distortions and noises.

The method and apparatus here disclosed requires two or more distinct sound recordings derived from the same original performance. The records are played simultaneously to obtain the benefits of binaural reproduction.

It is an object to make a single record having recorded thereon two recordings derived from the same original performance, which recordings are to be reproduced through separate channels by multiple-channel reproducing apparatus.

It was possible for the early acoustical systems to record and reproduce sounds faithfully over a narrow frequency range but not over the entire range of audible frequencies. I have found that this deficiency can be corrected noticeably by playing duplicate records in synchronism through separate channels. Preferably, one reproducing head is employed of the electrical type to provide an expanded frequency range and to enable both frequency and volume compensation. In playing duplicate records in this manner random defects are not apparent because the overlapping of the two reproductions tends to minimize any deficiencies appearing in one record at a time. Also, two differing sound reproduction patterns are presented to each ear of the listener, which is a psychological concomitant of realism in sound perception.

Specifically, by carefully selecting duplicate recordings from the same original performance and by playing the same simultaneously in synchronism but preferably in a slight out-of-phase relationship, new re-recordings of original master records have been obtained having (1) better signal to noise ratio, (2) a fill-in or reconstruction of defective areas where signal to noise ratio was poor or tone quality was distorted, (3) an "opening-up" or expansion of wave front, (4) an apparent wider frequency range, and (5) a better psychological adjustment of tonal balance to meet listening pleasure.

These and other objects and features of the invention will be apparent from the following description and the appended claims.

In the description of my invention reference is had to the accompanying drawings, of which:

Figures 1, 3:
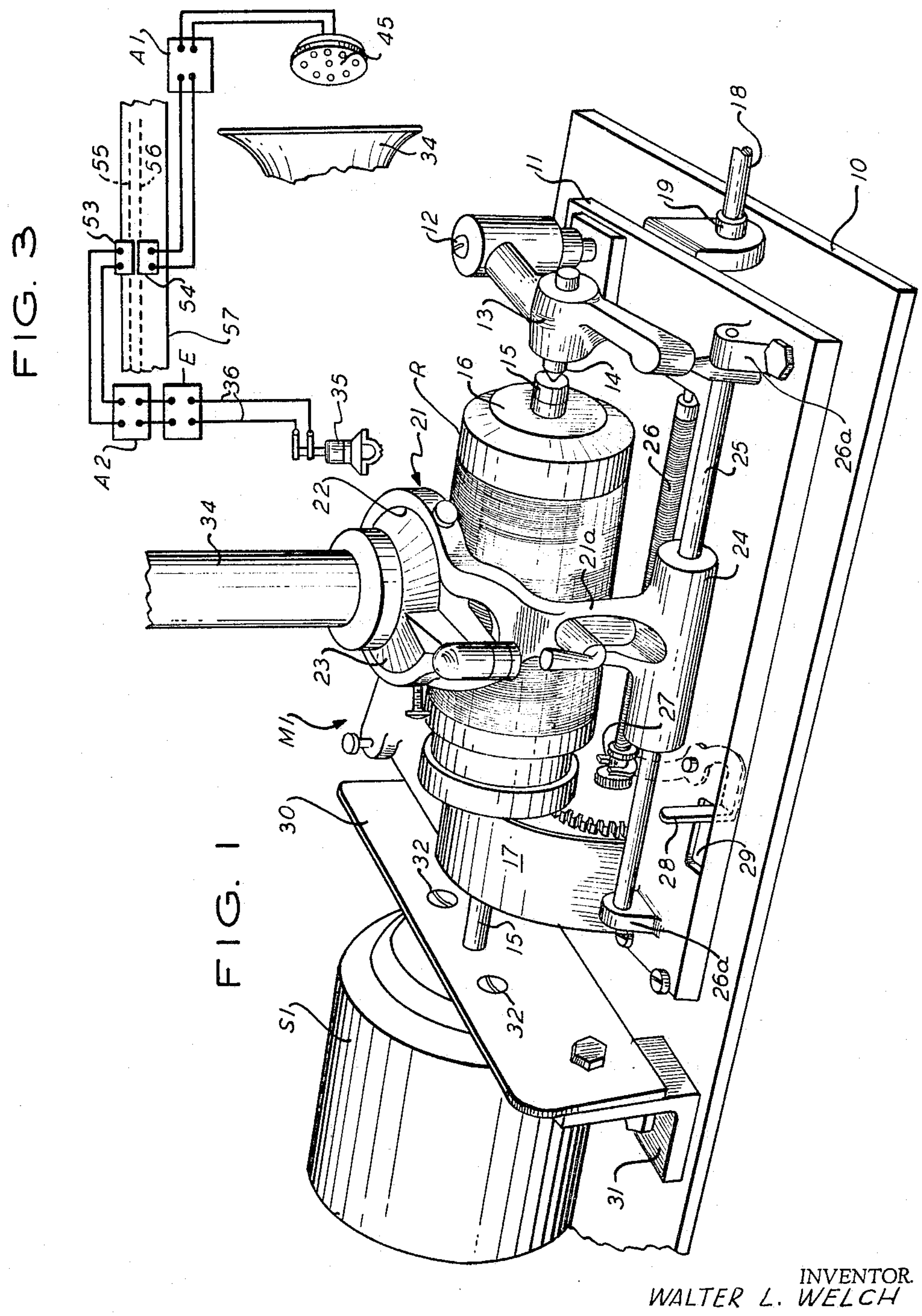
FIGURE 1 is a perspective view of an early acoustic-type cylinder-record phonographic machine.
FIGURE 3 is a fractional view illustrating a stereophonic recording of dual records according to the invention in separate tracks on a tape medium.

The cylinder-record phonographic machine shown in FIGURE 1 has a base plate 10 on which is supported a frame 11 of the machine proper. The frame has an upright post 12 on which an end gate 13 is pivoted carrying a conical spindle 14 for engaging the free end of the shaft 15 of a mandrel 16. The mandrel is slightly tapered to receive a similarly tapered bore in a cylindrical record $R_1$. The other end of the mandrel shaft 15 extends through a housing 17 at the left of the mandrel. In this housing there is a spring motor provided with a centrifugal governor (not shown) such as was standard with early phonographic machines. The spring motor is wound up by a shaft 18 beneath the frame 11, which extends beyond the right end of the frame through a bearing 19 and terminates in a handle 20 (FIGURE 2).

A carriage 21 extends from front to back across the cylindrical record $R_1$ and has a large mounting hole 22 at the top to receive a recorder-reproducer head 23. The carriage has a forward depending leg **21*a* terminating in a long transverse bearing 24 which is mounted slidably on a cross rod 25 supported in standards 26*a* at its ends. The carriage is supported slidably at its rearward end as on a cross rail (not shown). Below the mandrel and just back of the front leg of the carriage is a transverse feed screw 26 coupled by gearing 27 (partially shown) to the mandrel shaft 15. On the back side of the front leg of the carriage is a feed nut (not shown) which engages the feed screw to propel the carriage along the mandrel as the mandrel is rotated. A brake member 27 is engageable with the feed screw 26 by means of a manual lever 28 extending through a slot 29 in the front portion of the frame. The spring motor is wound up while the brake is engaged, and the motor is started and stopped by means of the brake lever 28**.

To the left of the motor housing 17 is a pair of spaced angle iron frames 30 and 31 bracketed to the base plate 10. A Selsyn motor $S_1$ is end mounted between these frames and held rigidly in place by screws 32. The Selsyn motor has its shaft coupled to the mandrel shaft 15. The Selsyn motor is used for synchronizing purposes as is later explained.

Figure 2:
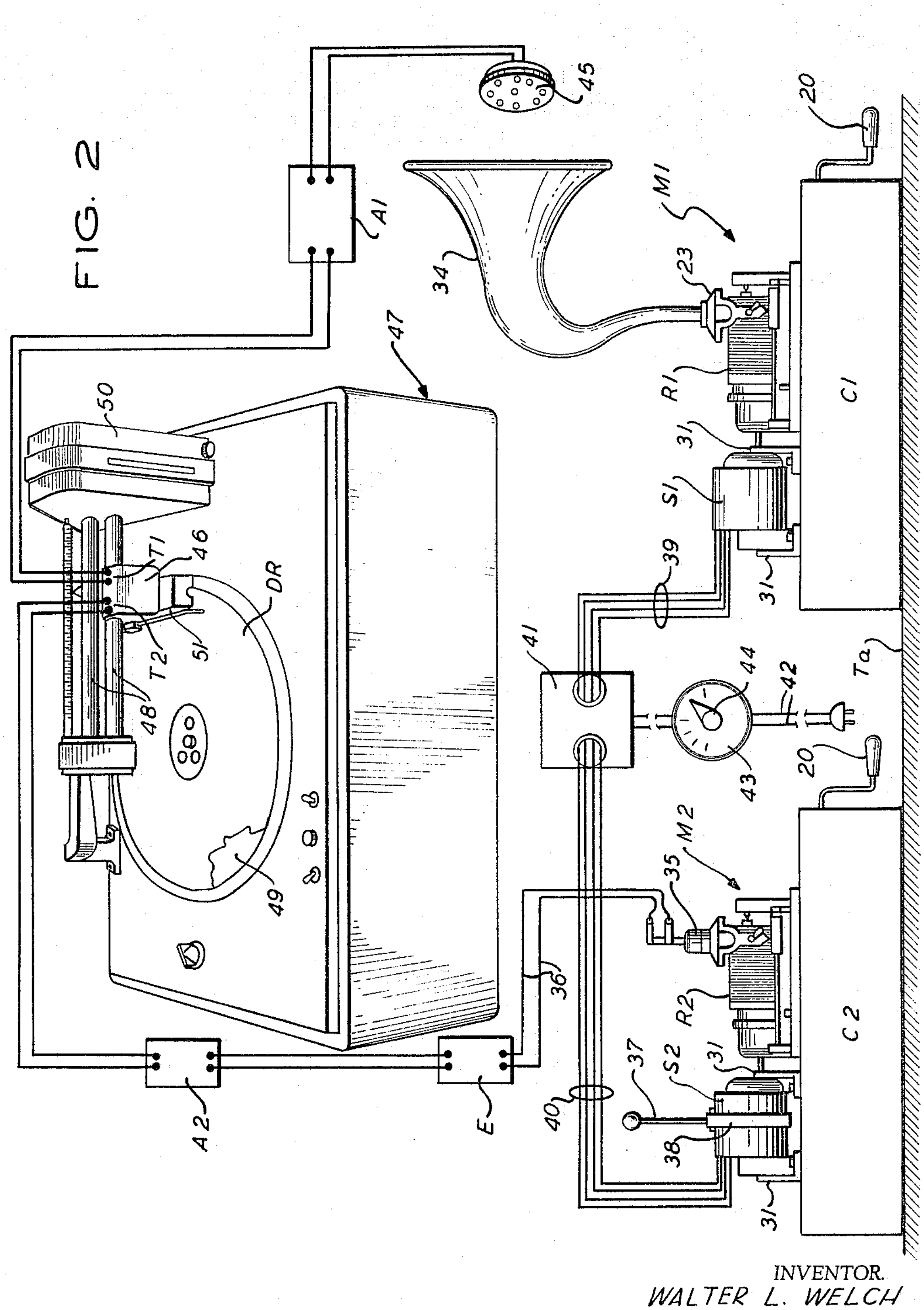
FIGURE 2 is an assembly view partly perspective and partly in elevation of dual reproducing machines respectively as shown in FIGURE 1 and of a disk type stereophonic recording machine by which new re-recordings are made according to the invention.

As shown in FIGURE 2, two reproducing machines $M_1$ and $M_2$ of the type above described are respectively mounted on cabinets $C_1$ and $C_2$ which are in turn placed as on a common table *Ta*. These two machines are identical except that (1) the machine $M_1$ has preferably an acoustic reproducing head 23 feeding into a horn 34 and the machine $M_2$ has an electromagnetic reproducing head 35 to which is connected a pair of lead out wires 36, and (2) the Selsyn motor $S_2$ of the machine $M_2$ is mounted rotatably and frictionally held between the angle iron frames 31, and is provided with a handle 37 secured by clamping band 38 to the motor to permit the Selsyn motor $S_2$ to be shifted angularly about its axis through an approximate 180° range. This angular adjustment of the motor $S_2$ is utilized to shift the phase relationship between the cylinder records of the two machines as is later described.

The Selsyn motors have five wire cable connections 39 and 40 to a terminal box 41 which is powered from a 110 volt A.C. line 42 through a variable transformer 43 such, for example, as that known commercially as a Variac. By means of a knob 44 on the variable transformer the voltage fed to the terminal box can be gradually increased from zero to normal value.

The sound output from the horn 34 of the machine $M_1$ is picked up by a microphone 45 and fed through an amplifier $A_1$ to one set of terminals $T_1$ of the recording head 46 of a stereophonic recording machine 47. This recording machine may be an RCA professional recorder type 73–B except for the provision thereof with a stereophonic recording head. The electrical output from the reproducer head 35 of the machine $M_2$ is fed by lead wires 36 through an equalizer E and an amplifier $A_2$ to a second pair of terminals $T_2$ of the recording head 46. The recording head 46 of the recording machine 47 is mounted slidably on a pair of cross rods 48 for a driven movement by a feed screw (not shown) across a disk record DR mounted on a turntable 49. The support rods and feed screw are mounted in an upright structure 50 at the side of the turntable. By means of an arm 51 the recorder head can be raised from or lowered onto the disk record. The recording head has a cutting stylus which forms in effect two tracks in a single groove—for example, one track which is vertically modulated and the other track laterally modulated or the now standard 45°–45° Westrix stereo cutter—to record respectively the outputs from the reproducing machines $M_1$ and $M_2$. Such dual-track groove can then be reproduced by stereophonic reproducting apparatus to feed the sounds from the respective tracks through dual channels to respective speakers according to standard stereophonic practise.

In the present re-recording process, two cylinder records of the same recording originating from the same original recording are mounted on the mandrels of the cylinder reproducer machines $M_1$ and $M_2$. A careful synchronizing process is then carried out as follows:

(1) The beginning note on one cylinder record is found by starting the motor of that machine while the current to the Selsyn motor is shut off. When the starting point is located the brake of the motor is applied with the stylus of the reproducing head being left on the record. This locating procedure for the starting note of the cylinder record on the machine $M_2$ is then carried out in the same way. The angular position of the second cylinder to the respective reproducer head is then marked, the reproducer head is lifted from the record and the record is loosened from the mandrel. The brake of the second machine is then released but the mandrel is held by hand from turning, the current is slowly turned on to the Selsyn motors and then the second mandrel is released gradually by the fingers to allow it to turn into its interlocked position with the mandrel of the first machine now held stationary by the motor brake. The brake of the second machine is then reapplied and the synchronizing current to the Selsyn motor is turned off.

(2) The cylinder record of the second machine $M_2$ is now pressed back onto its mandrel in its starting position relative to the reproducer head, and the reproducer head is again lowered to engage the stylus at the beginning note of the recording. Since this restoring of the second cylinder onto its mandrel is carried out with the synchronizing current off the interlock relationship between the two mandrels may be disturbed slightly. In order to correct for any such disturbance the brake of the second machine is again released while the mandrel is held by the hand from turning, the synchronizing current is again turned on gradually and the mandrel is released to allow the same to find its true interlock position with the mandrel of the first machine. Whatever displacement now exists in the beginning note position on the cylinder of the second machine from the stylus of the reproducer head 35 is corrected by shifting the Selsyn motor $S_2$ by the handle 37. Thus, the motors of the two machines $M_1$ and $M_2$ are interlocked with the styli of the machines both at beginning note positions on the respective records.

(3) The synchronizing current is turned on and both brakes are released while the mandrel of one machine is held manually from turning, the synchronizing current then operating to hold also the second mandrel from turning due to their interlock condition. Both cylinders are then manually turned back several revolutions depending on the length of unmodulated lead-in groove on the records, and the brakes are then re-applied. When both brakes are next released the two mandrels will come up to speed within the length of the lead-in groove and will be held in exact synchronism. It will be understood that in this driving operation the mandrels are driven by the respective spring motors and the Selsyn motors operate only to retain the two motors in exact synchronism. Since the Selsyn motors operate to hold the two motors in exact synchronism, any speed variation tendency in one machine is retarded or compensated by the governor action in the other machine with the result that the two machines operate at a very constant speed. By moving the handle 37 the phase of one machine can be shifted into an advanced or retarded relationship to the other. It is found that best sound results are obtained when one machine is placed slightly out of phase relative to the other.

Although the method herein described of synchronizing the two mandrels is preferred because of its simplicity, steadiness of speed and precise phase control, other synchronizing means may be employed as by directly coupling the two mandrels, intercoupling the mandrels through a differential mechanism to permit phase adjustment or by driving the mandrels respectively by synchronous motors operating from the same power source.

The basic concept of my invention of playing simultaneously through separate channels in a precise phase relationship two duplicate records from the same master may be carried out by using two reproducing heads both of the acoustic type, or both of the electrical type, or one of the acoustical type and the other of the electrical type as above described. The use of one acoustical reproducer head and the other an electrical reproducer head is preferred, however, in the interest of preserving the original character of the recording while allowing some frequency and volume compensation through the use of an equalizing or compensating network E in the output circuit of the electrical reproducing head. Such equalization or compensation may comprise an emphasizing of the lower and/or higher frequency ranges of the recordings but will vary from recording to recording depending upon the character of the musical composition and on whatever deficiencies may have arisen in the process of duplicating the records from the original recording.

It has been found that the re-recordings for stereophonic reproduction made according to the present invention have an apparent reduction in surface noise due to cancellation effects and an expanded wave front due to the playing of two records simultaneously in a stereophonic manner through two speakers spaced suitably from each other according to the size and acoustic conditions of the room. Furthermore, it is found that there is an apparent elimination of random defects such as distortions, click or buzz sounds, or reduced volume levels at localized points due to the fact that the listener by his concentration on the music tends to ignore any noise or deficiency in the recording which is not common to both records.

In the alternative arrangement illustrated by FIGURE 3 the electrical reproducer circuit 36 is connected to a tape recorder head 53 and the electrical output circuit of the microphone 45 is connected to a separate tape recorder head 54. The heads 53 and 54 record on respective tracks 55 and 56 of a tape record medium 57. It will be understood that the tape 57 is driven in the usual way by standard tape drive mechanism not herein necessary to show. In reproducing such tape record the respective heads 53 and 54 or separate heads, as the case may be, would be operated as reproducing heads and would feed through respective channels to respective speakers as hereinbefore described.

The embodiment of my invention herein particularly shown and described is intended to be illustrative and not limitative of my invention, since the same is subject to changes and modifications without departure from the scope of my invention, which I endeaver to set forth in the following claims.

I claim:

1. The method of producing improved re-recordings of original recordings which comprises selecting a plurality of records produced from the same original master, playing said plurality of records while maintaining the same in a controlled relationship slightly out of phase with true synchronization, and recording the reproduced sounds from said records on a single record medium for combined reproduction through separate speakers, whereby defects in one record are compensated by another and the resulting combined reproduction has improved depth, quality and spacial characteristics.

2. The method of making improved re-recordings of original recordings which comprises selecting duplicate recordings originating from the same master, reproducing one of said duplicate recordings with an acoustic reproducing head, converting by a microphone and amplifier the reproduced sounds into corresponding electrical signals, reproducing in synchronism the other duplicate recording with an electrical reproducing head, feeding the signal output of the electrical reproducing head through a compensating network and amplifier, and recording individually the sound-representing signals from said amplifiers on a record medium for stereophonic reproduction.

3. The method of making improved re-recordings of original recordings which comprises selecting duplicate records produced from the same master, reproducing said duplicate records simultaneously while maintaining the same in a synchronized out-of-phase relationship adapted to effect a substantial cancellation of signal noises, and recording on a new record medium the electrical sound-representing signals from said respective duplicate records.

4. The method of synchronizing two reproducing machines in a predetermined phase relationship for playing simultaneously two duplicate recordings originating from the same master, which comprises setting the reproducer head of one machine at the beginning note of the respective recording, separately setting the reproducer head of the other machine at the beginning note of its recording, noting the beginning-note positioning of one recording relative to the reproducing head and then loosening the respective record from its support, bringing the drive mechanisms of the two machines into an interlocked phase relationship, and then remounting said one record on its support at its beginning-note position relative to the respective reproducer head.

5. An apparatus for re-recording early original recordings which comprises two reproducing machines, means for interlocking said machines in synchronism with each other for playing simultaneously two recordings originating from the same master, means for shifting the phase of one of the machines relative to the other while the machines are interlocked for synchronous operation and are running, and means for concurrently re-recording the reproduced signals from said two records on a new record medium for stereophonic reproduction.

6. An apparatus for re-recording early original recordings which comprises two reproducing machines wherein one of said reproducing machines has an acoustic reproducer head including a horn, microphone and amplifier for feeding electrical signals to a stereophonic recording head, and wherein the other said reproducing machine has an electrical reproducing head including an amplifier for feeding electrical signals also to said stereophonic recording head, including means for modifying or compensating at least one of said electrical sound-representing signals, means for interlocking said machines in synchronism with each other for playing simultaneusly two recordings originating from the same master, and means for concurrently re-recording the reproduced signals from said two records on a new record medium for stereophonic reproduction.

7. Apparatus for re-recording original phonographic recordings comprising two reproducing machines respectively having rotatable means for supporting duplicate records from the same matrix, spring wound motors and brakes for the respective motors, Selsyn motors coupled to said spring motors respectively, an electrical current source for said Selsyn motors for interlocking said spring motors to operate together in synchronized relationship to each other, means for angularly shifting one of said Selsyn motors to adjust the synchronized phase relationship between said motors, respective reproducing heads in said machines for engaging said records, each of said reproducing heads being initially set at the beginning-note position of the respective duplicate record while said spring motors are interlocked in synchronized relationship, a stereophonic recording machine for simultaneously recording on a new record medium two signals in respective record tracks for stereophonic reproduction, and means for feeding signals from said reproducing heads to said stereophonic recording machine.

8. The apparatus set forth in claim 7 wherein said stereophonic recording machine is a tape recorder having two recording heads for recording simultaneously in separate tracks on a tape record medium the reproduced signals from said duplicate records.

References Cited by the Examiner

UNITED STATES PATENTS

| | | | |
|---|---|---|---|
| 1,508,432 | 9/1924 | Wier | 179—100.4 |
| 2,019,616 | 11/1935 | Maxfield | 179—100.4 |
| 2,114,471 | 4/1938 | Keller et al. | 179—100.4 |
| 3,118,977 | 1/1964 | Olson | 179—100.2 |

FOREIGN PATENTS

| | | |
|---|---|---|
| 685,882 | 12/1929 | France. |
| 1,068,906 | 11/1959 | Germany. |

NORTON ANSHER, *Primary Examiner.*

C. B. PRICE, *Assistant Examiner.*